United States Patent
Ai et al.

(10) Patent No.: US 7,291,245 B2
(45) Date of Patent: Nov. 6, 2007

(54) PROCESS FOR CAUSTICIZING GREEN LIQUOR IN CHEMICAL RECOVERY FROM BLACK LIQUOR IN ALKALINE PULPING

(75) Inventors: Tianzhao Ai, Kaifeng (CN); Xuezhi Dong, Kaifeng (CN); Dong Ai, Kaifeng (CN)

(73) Assignees: Tianzhao Ai, Kaifeng (CN); Xuezhi Dong, Kaifeng (CN); Dong Ai, Kaifeng (CN); Xuesheng Dong, Kaifeng (CN)

( * ) Notice: Subject to any disclaimer, the term of this patent is extended or adjusted under 35 U.S.C. 154(b) by 48 days.

(21) Appl. No.: 10/503,812

(22) PCT Filed: Apr. 25, 2002

(86) PCT No.: PCT/CN02/00290

§ 371 (c)(1),
(2), (4) Date: Apr. 25, 2005

(87) PCT Pub. No.: WO03/066961

PCT Pub. Date: Aug. 14, 2003

(65) Prior Publication Data

US 2005/0199358 A1    Sep. 15, 2005

(30) Foreign Application Priority Data

Feb. 9, 2002  (CN) ................................ 02 1 04836

(51) Int. Cl.
*D21C 11/04* (2006.01)
(52) U.S. Cl. .................. 162/35; 162/29; 162/30.1; 423/DIG. 3

(58) Field of Classification Search .................. 162/29, 162/30.1, 30.11, 90, 35; 423/430, 432, DIG. 3
See application file for complete search history.

(56) References Cited

U.S. PATENT DOCUMENTS 2,560,016 A * 7/1951 Walker ........................ 423/640

(Continued)

FOREIGN PATENT DOCUMENTS

CN            1045567 A        9/1990

(Continued)

OTHER PUBLICATIONS

Sven A. Rydholm, Pulping Processes, Sep. 1967, Interscience Publishers, pp. 777, 779, and 791-801.*

(Continued)

*Primary Examiner*—Eric Hug
(74) *Attorney, Agent, or Firm*—Sterne, Kessler, Goldstein & Fox P.L.L.C.

(57) ABSTRACT

The improved process is achieved by introducing depuration of green liquor and lime before causticization and two special causticization steps in causticization procedure of conventional chemical recovery processes. It not only avoids the generation of waste residue (lime mud) from the beginning and saves the re-burning and filling land of lime mud, but also can directly produce a series of precipitated calcium carbonate products with various particle sizes by regulating process conditions while alkali is recovered. The $CaCO_3$ products include $CaCO_3$ wherein $\geq 50\%$ of $CaCO_3$ has a particle size below 2 μm, $CaCO_3$ wherein $\geq 90\%$ of $CaCO_3$ have a particle size below 2 μm, and a superfine $CaCO_3$ having an average particle size <1 μm. The $CaCO_3$ obtained by this process can be directly used for papermaking and other industrial applications.

12 Claims, 1 Drawing Sheet

Block flow diagram of the process

U.S. PATENT DOCUMENTS

| | | | | |
|---|---|---|---|---|
| 4,397,248 A | * | 8/1983 | Mehta et al. | 110/263 |
| 4,941,945 A | * | 7/1990 | Pettersson | 162/29 |
| 5,628,875 A | * | 5/1997 | Liden et al. | 162/30.1 |
| 6,074,521 A | * | 6/2000 | Engdahl et al. | 162/29 |
| 6,627,170 B2 | * | 9/2003 | Takahashi et al. | 423/432 |

FOREIGN PATENT DOCUMENTS

CN    1239166 A    12/1999

OTHER PUBLICATIONS

Dialog File 351, Accession No. 13024195, Derwent WPI English language abstract for CN 1239166 A, Dec. 1999.

esp@canet English language abstract for CN 1045567 A, Sep. 1990.

International Search Report for International Application No. PCT/CN02/00290, Chinese Patent Office, China, mailed on Sep. 5, 2002.

* cited by examiner

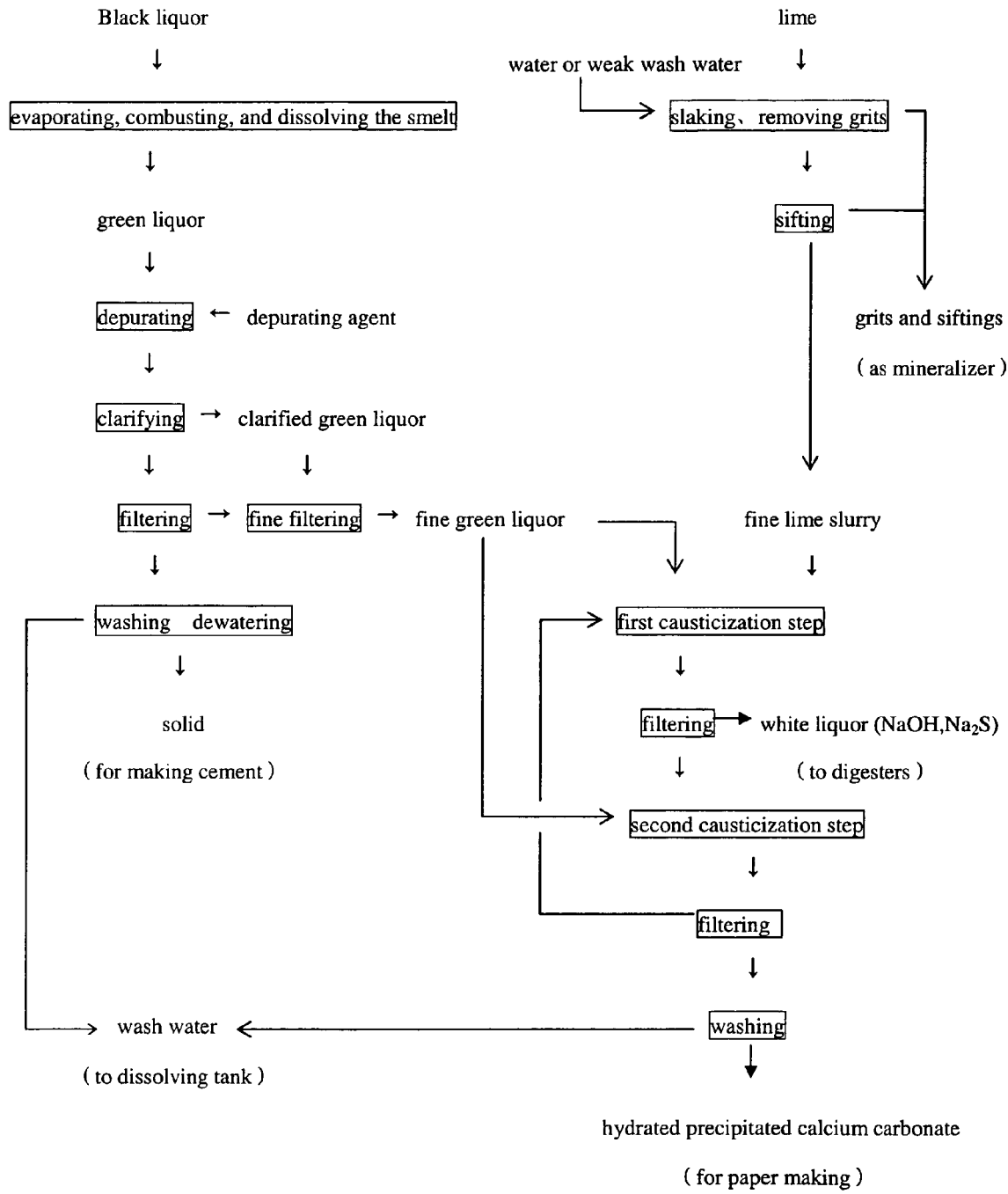
Fig.1 Block flow diagram of the process

PROCESS FOR CAUSTICIZING GREEN LIQUOR IN CHEMICAL RECOVERY FROM BLACK LIQUOR IN ALKALINE PULPING

FIELD OF THE INVENTION

The present invention relates to an improved process for causticizing green liquor in chemical recovery from black liquor in alkaline pulping, said process being useful for the pollution treatment of black liquor generated in alkaline pulping mills (wood pulping and straw pulping), especially for the technical innovation of the traditional chemical recovery process of black liquor by combustion method.

BACKGROUND OF THE INVENTION

The black liquor pollution of alkaline pulping and its treatment has been a world wide environmental problem. At present, the common way to treat the black liquor is to recover chemicals by combustion method. The detailed description of the mentioned method can be found in *Pulp and Paper Manufacture* (edited by E. W. Earl Malcolm, T. M. Tom Grace [American], translated by Cao Bangwei [Chinese], Chinese Light Industry Press, Beijing, 1998.6), wherein the technical process of said method summarily comprises: obtaining a green liquor by dissolving the smelt formed by evaporating and burning the black liquor, and obtaining an alkali liquor that is commonly named white liquor by causticizing the green liquor with excess lime. This method eliminates the pollution of black liquor and recovers alkali therefrom, but it generates a larger quantity of alkaline waste residue (named as lime mud), which consequently causes a serious secondary pollution. Currently, wood pulping mills generally calcine the lime mud to produce lime that can be recycled and reused in the process. However, this method needs a relatively high investment and energy consumption (about 250 kg of fuel oil is needed to produce one tone of lime) and brings about little economic value. In fact, this method is adopted only for eliminating the secondary pollution of lime mud. For straw pulping mills, the lime mud is not suitable for calcinations due to the high content of silicon in it, thus the lime mud is either introduced into rivers or lakes, or accumulated in dumping sites. For many years, numerous researchers in the world have been trying to develop a simple and feasible method for recovering or treating the lime mud, especially the lime mud generated in straw pulping mills. Unfortunately, the most of the researchers only focus on the treatment and utilization of the lime mud generated in the traditional chemical recovery process, and few of them have a way to avoid the formation of this waste residue (lime mud) from the beginning.

AI Tian-Zhao's patent application (CN1239166) disclosed "a new technology for causticizing green liquor generated in the process for recovering chemicals from black liquor in alkaline pulping", which avoided the generation of lime mud and produced normal precipitated calcium carbonate while alkali was recovered. However, due to the higher reaction temperature and other limitations of process conditions, the calcium carbonate particles produced by said patent application were relatively large (with an average particle size around 5 μm), and could be used only in some situations of paper-making industry where calcium carbonate with a relatively large size is needed, and were not satisfactory for making coated paper or neutral sized paper or for other industries that need smaller particle sizes.

With the economical development, the need for the smaller size calcium carbonate, particularly those with an average particle size of less than 1 μm, has increased drastically in papermaking industry and other industries. Thus, studying a way to produce microfine or superfine precipitated calcium carbonate has become a hot research subject in the calcium carbonate industry in world. However, the research thinking is always focused on carbonization process, and there is no one who ever has thought on how to produce superfine precipitated calcium carbonate through the causticization reaction in the chemical recovery process of black liquor in alkaline pulping.

DETAILED DESCRIPTION OF THE INVENTION

1. Technical Problem to be Solved by the Present Invention and the Object of the Present Invention The technical problem to be solved by the present invention is to eliminate the secondary pollution of lime mud in the conventional chemical recovery process of black liquor in alkaline pulping and thus to eliminate the need for recovering and treating the lime mud, but it is not to recover or treat the lime mud of the conventional chemical recovery process. The object of the present invention is to provide a new improved process for recovering chemicals from black liquor in alkaline pulping, by introducing critical technical transformations into the causticization procedure of the conventional chemical recovery process. The process provided by the present invention not only avoids the generation of the waste residue (lime mud) from the beginning and saves the procedure for recovering and treating the lime mud, but also can directly produce a series of precipitated calcium carbonate products with various particle sizes for a plurality of industrial applications by regulating different process conditions while the alkali is recovered, said $CaCO_3$ products including a calcium carbonate suitable for making coated paper, wherein $\geq 50\%$ of the $CaCO_3$ has a particle size below 2 μm; a calcium carbonate suitable for making neutral sized paper, wherein $\geq 90\%$ of the $CaCO_3$ has a particle size below 2 μm; a superfine calcium carbonate having an average particle size of <1 μm, and so on. The present invention is of great environmental significance and enormous economical return at the same time.

2. Technical Solution of the Present Invention

In order to solve the secondary pollution and recovery of lime mud generated from the conventional chemical recovery process of black liquor in the alkaline pulping, the inventors of this invention have done a huge amount of research work to understand the mechanism of lime mud formation. The studies show that the major component in the lime mud generated in the conventional chemical recovery process is $CaCO_3$ that is formed by the causticization reaction. This lime mud cannot be used as a valuable commercial calcium carbonate product because it further contains impurities introduced by green liquor and lime, and also unreacted excess CaO. In order to directly produce $CaCO_3$ product while alkali is recovered, the present invention introduces some critical innovative technical transformations in the causticization procedure of the conventional chemical recovery process. The concrete technical solution of this invention comprises the following features.

(1) Addition of a Lime Depuration Step Before the Causticization Reaction

In the conventional chemical recovery process of the alkaline pulping, the green liquor is directly used to slake lime. In this way, all impurities in the lime are introduced into the causticization reaction system. Although some rough lime grits are drawn out and removed after slaking, the majority of impurities in lime are still remained in the $CaCO_3$ generated by the causticization reaction, therefore affecting the purity of $CaCO_3$. In order to avoid this, the present invention adds a lime depuration step before the lime is mixed with the green liquor, thus the impurities in the lime are pre-separated, and cannot enter the causticization reaction system, and these impurities cannot exist in the $CaCO_3$ formed by the causticization reaction. The detailed procedures of the lime depuration are as follows:

Pre-slaking the lime with water or weak wash water to form a lime slurry, separating the rough lime grits from the lime slurry, then sifting the lime slurry with a 180-800 mesh sieve screen (excluding 180 mesh sieve screen) to obtain a fine lime slurry that is ready to use for the causticization. The siftings and rough lime grits separated from the lime slurry are mixed and incorporated into coal powder as a mineralizer when the coal is burned in a coal burning boiler.

(2) Addition of a Green Liquor Depuration Step Before the Causticization Reaction In the conventional chemical recovery process, the green liquor from the combustion procedure is only subjected to a simple clarification to partially remove dregs, and then the supernatant green liquor is directly used for slaking lime. Since the black solid impurities (commonly named as dregs) in the green liquor are superfine particles in colloidal state, their sedimentation velocity is very slow, thus, the supernatant green liquor after the clarification still contains a significant amount of dregs. After said supernatant green liquor enters the causticization reaction system, the dregs therein not only directly affects the purity and whiteness of the $CaCO_3$ formed by the causticization reaction, but also makes white liquor difficult to clarify, and makes lime mud difficult to filtrate and wash. Thus, the normal function of the whole chemicals recovery process is impeded.

In the study on the physical properties of the dregs in the green liquor, the inventors of the present invention find that in the dregs, the hydroxides and sulfides in colloidal state are very fine particles and possess positive charges on the surface. Thus, the repulsive forces of homogeneous charges make these particles difficult to aggregate and settle. Since the dregs carry positive charges and the major component of the green liquor is $Na_2CO_3$, the present invention uses $Ca^{2+}$ ions to depurate the green liquor. According to the depuration mechanism, all substances that can provide enough $Ca^{2+}$ ions can be used as depurating agent for green liquor, said substances including solutions, suspensions or solids containing any one of various soluble calcium salts (e.g. $CaCl_2$, $Ca(NO_3)_2$ etc.), CaO and $Ca(OH)_2$, or mixtures thereof. In view of the economical point and possible influences on subsequent procedures, the slurry containing $Ca(OH)_2$, or solution containing $CaCl_2$ or a mixture of the both as a depuration agent for green liquor is more appropriate. The detailed procedures and mechanism of the green liquor depuration of the present invention are as follows:

The green liquor obtained by dissolving the smelt formed by evaporating and burning the black liquor is added in a depurator. At a temperature between 0° C. and 80° C. (excluding 80° C.), a depurating agent for green liquor (containing $Ca^{2+}$ ions as major active component) is added in the depurator under stirring. Consequently $Ca^{2+}$ ions in the depurating agent react with $Na_2CO_3$ in the green liquor to form $CaCO_3$ precipitates. These newly formed $CaCO_3$ precipitates possess a large specific surface, and therefore have a strong adsorption capacity. According to the adsorption law that the surface of precipitates preferentially adsorbs the ions that constitute the crystal thereof, the surfaces of $CaCO_3$ precipitates preferentially adsorb $CO_3^{2-}$ ions that constitute the $CaCO_3$ crystal in the green liquor that contains a large amount of $Na_2CO_3$, so that the surfaces of the $CaCO_3$ precipitates possess negative charges. Through the electrostatic attraction, these negatively charged $CaCO_3$ precipitates attract the positively charged colloidal substances (dregs) in the green liquor, and this consequently causes a rapid aggregation and precipitation. During this aggregation process, the small and lower density carbon particles produced by incomplete combustion and other impurities are embodied in aggregates and are co-precipitated rapidly. In addition, the newly formed $CaCO_3$ is an excellent coprecipitator, so that besides the colloids in the green liquor that can rapidly aggregate with it, other impurities, such as metal ions $Fe^{3+}$, $Fe^{2+}$ and $Al^{3+}$ etc in the green liquor are coprecipitated all together with it as well. After the addition of the depurating agent accompanied with sufficient agitation, the mixed green liquor is transferred into a green liquor clarifier, and is settled for 3-10 minutes to essentially settle all solids and to obtain clear and transparent green liquor. After settling for 3-6 hours in the clarifier, an essentially colorless, clear and transparent green liquor can be obtained. The supernatant of the clarified green liquor is further fine filtered to completely remove any remaining solid. The fine filtered green liquor that is called as the fine green liquor is stored in a tank and is ready to use for causticization. The solids that are formed by filtering the dregs at the bottom of the clarifier and are no longer colloidal substances, are combined with the solids formed by the fine filtration, and then washed and dehydrated, and used as a primary material in Portland cement production.

The dosage of depurating agent for green liquor is crucial. When the dosage is relatively little, the newly formed $CaCO_3$ precipitates are not enough to carry negative charges on their surfaces sufficient to neutralize all positive charges on the surfaces of colloids in the green liquor, so that the aggregation and sedimentation velocity of solid are affected. On the other hand, when too much of depurating agent is added, excessive negative charges remain on the surfaces of the $CaCO_3$ precipitates after neutralizing all positive charges on the surfaces of the colloids, which also affects the sedimentation velocity. The specific dosage of depurating agent should be determined based on the quantity of colloids present in the green liquor. When a slurry containing $Ca(OH)_2$ (expressed as CaO) is solely used as a depurating agent for the green liquor, the weight ratio of the CaO in the depurating agent slurry to the $Na_2CO_3$ in the green liquor is 0.01-1:106.

(3) Direct production of a series of precipitated calcium carbonate products via a two-step-causticization procedure while the alkali is recovered, wherein said $CaCO_3$ products with various particle size are useful for a plurality of industrial application, including precipitated calcium carbonate suitable for making coated paper and neutral sized paper, and a superfine precipitated calcium carbonate having an average particle size of less than 1 µm, and so on.

In the conventional chemical recovery process, there is only one step of causticization, and an excessive quantity of lime is usually added so as to increase the causticity of sodium carbonate. Thus, the waste residue (lime mud) discharged from such a causticization system must contain un-reacted excess CaO. In addition, in the conventional chemical recovery process, the green liquor is usually directly reacted with the lime, and the causticization reaction is generally conducted at a relatively higher temperature (usually higher than 90° C.) for accelerating the reaction rate. According to the theory of precipitates formation, the higher the reaction temperature, the larger the formed precipitates particle size is. Therefore, the particle size of the $CaCO_3$ generated in the conventional chemical recovery process is relatively large.

In the present invention, by using a two-step-causticization, not only the causticity of $Na_2CO_3$ is increased, but also all CaO added into the reaction system is allowed to take part in the reaction and to be completely converted into $CaCO_3$. In order to obtain fine $CaCO_3$ particles, a lower reaction temperature between 0° C. and 70° C. (excluding 70° C.) is applied in the causticization reaction of the present invention. In the present invention, since the fine lime slurry obtained by lime depuration is used in the causticization reaction, a relatively high reaction rate is still achieved at a relatively lower temperature.

The said two-step-causticization of the present invention comprises the following procedures:

Conducting the first causticization step by adding the fine green liquor and the fine lime slurry obtained by depuration into a causticiser at a temperature between 0° C. and 70° C. (excluding 70° C.), wherein the quantity of CaO in the fine lime slurry is 1-1.6 times of the theoretical quantity needed for the causticization reaction. The causticization reaction is:

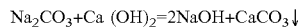

In the first causticization step, because excessive amount of CaO is added, the high causticity of $Na_2CO_3$ is ensured. After the first causticization step, the solid and liquid phases are separated by filtration or centrifugation or other methods, and then the separated alkali liquor (commonly called as white liquor) is sent to digester for pulp making. The separated solids contain the $CaCO_3$ generated in the first causticization step and the un-reacted excess CaO. To remove the excess CaO in the said solids, the second causticization step is conducted by adding an excessive amount of the fine green liquor into said separated solids from the first causticization step at a temperature between 0 and 70° C. (excluding 70° C.), wherein the ratio of the weight of the $Na_2CO_3$ contained in the fine green liquor to the weight of the un-reacted excess CaO contained in the separated solids from the first causticization step is 106n: 56, wherein n=1-50. In the second causticization step, the un-reacted excess CaO in the said solids is all completely converted into $CaCO_3$ because of a large excess of $Na_2CO_3$. After all CaO is completely converted into $CaCO_3$ in the second causticization step, the liquid and solid phases are separated. The separated liquid is returned to the first causticization step, because it contains a large amount of un-reacted excess $Na_2CO_3$, and the separated solid is washed to obtain a pure hydrated precipitated calcium carbonate.

The particle size of the precipitated calcium carbonate obtained by said process of the present invention can be controlled by regulating the process conditions. The smaller the aperture of the sieve screen used for sifting the lime slurry, the lower the causticization reaction temperature, the higher the concentrations of reactants in the causticization reaction, the smaller the particle size of the obtained $CaCO_3$ is. When the sieve screen used for sifting lime slurry is a 200 (or more) mesh sieve screen, the causticization reaction temperature is lower than 70° C., and the total alkalinity of the causticization liquor (expressed as NaOH) is >80 g/L, a calcium carbonate product, wherein ≧50% of the $CaCO_3$ has a particle size below 2 μm, is obtained and can be used for making coated paper. When the sieve screen used for sifting lime slurry is a 400 (or more) mesh sieve screen, the causticization reaction temperature is lower than 50° C. and the total alkalinity of the causticization liquor (expressed as NaOH) is >90 g/L, a precipitated calcium carbonate product, wherein ≧90% of the $CaCO_3$ has a particle size below 2 μm, is obtained and can be used for making neutral sized paper. When the sieve screen used for the sifting lime slurry is a 500 (or more) mesh sieve screen, the causticization reaction temperature is lower than 40° C., and the total alkalinity of the causticization liquor (expressed as NaOH) is >100 g/L, a superfine precipitated calcium carbonate product having an average particle size of less than 1 μm is obtained.

3. The Beneficial Effects of the Present Invention

As compared to the conventional chemical recovery process of the black liquor in alkaline pulping, the present invention has the following beneficial effects.

(1) The present invention avoids the generation of waste residue (lime mud) from the beginning, and thus there is no need for the recovery and treatment of the lime mud, so that the equipment investment and the energy consumption for the chemical recovery process are reduced drastically. Further, in comparison with the conventional chemical recovery process, the present invention additionally produces a precipitated calcium carbonate product, an important chemical material for papermaking, while the alkali is recovered. Moreover, the present invention produces a series of precipitated calcium carbonate products with various physical properties such as particle sizes by regulating the process conditions, including precipitated calcium carbonate useful for making coated paper and neutral sized paper, and a superfine precipitated calcium carbonate product having an average particle size of less than 1 μm. These $CaCO_3$ products have good quality and can be used for papermaking and other industrial applications. Hence, the present invention can bring about considerable economic benefits.

(2) The present invention slakes lime with water or weak wash water, so that the lime grits is free of the alkaline chemicals from the green liquor. In addition, the obtained calcium carbonate contains less than 0.1% of free alkali (expressed as CaO). Therefore, the loss of alkali is very small in the present invention, and the yield of the recovered alkali is higher than that of the conventional chemical recovery process in some extent.

(3) In the present invention, the green liquor is depurated before causticization, so that the colloidal substances in the green liquor do not enter the reaction system, and the harmful effects of the colloidal substances on the causticization system are eliminated, the causticization reaction rate is accelerated. After causticization, the sedimentation velocity and the filtrating feature of the solids are increased remarkably, and the obtained white liquor is easy to clarify, and the precipitates are easy to filter and wash. These features are important to maintain an efficient function of the whole chemical recovery process, particularly for straw pulping mills.

(4) The precipitated calcium carbonate obtained by the process of the present invention has a special crystal form that is more suitable for using in papermaking, which represents an unexpected technical effect. Studies by scanning electron microscopy on several calcium carbonate samples obtained by the process of the present invention show that the crystal of these calcium carbonate has a shape of short rod with round smooth endings. The application experiments of using this calcium carbonate on paper machines show better performance in comparison with the calcium carbonate having a shape of spindle commonly used in papermaking. This may be due to that the calcium carbonate of the present invention is formed in a homogeneous liquid phase reaction system with controllable conditions. The mechanism of forming such a crystal form and the effects of using this calcium carbonate need more studies.

(5) In the conventional chemical recovery process, besides the lime mud, two other types of waste residues are also generated: one is grayish green lime grits that cannot be further utilized because it contains the dregs from green liquor; another one is colloidal dregs. In the present invention, lime is slaked with water or weak wash water, so that the lime grits and siftings are free of impurities from green liquor and can be directly incorporated into coal powder as a mineralizing agent for combustion. In the depuration step of green liquor of the present invention, the solids separated from the green liquor after the addition of depurating can be directly used as a raw material for the cement production. Hence, no waste residue and secondary pollution are generated in the present invention. Therefore, the present invention possesses an important environmental advantage.

(6) The present invention has a good compatibility with the conventional chemical recovery process, and can be achieved by merely modifying the causticization step of the conventional chemical recovery process in alkaline pulping. Further, this modification requires only a small investment, and the process is simple and easy to achieve.

THE DESCRIPTION OF THE DRAWING

The drawing attached to the description is a block flow diagram of the present invention.

EXAMPLE

The process of the present invention is illustrated in detail with the following examples.

Example 1

A quantity of green liquor containing 636 weight parts of $Na_2CO_3$ was taken from the combustion procedure of the chemical recovery process in a Kraft wood pulp mill, added in a depurator, and heated to 78° C. The $Ca(OH)_2$ slurry containing 3.6 weight parts of CaO was added into the depurator under stirring. After sufficient agitation, the mixed green liquor was transferred into a clarifier. The supernatant of the clarified green liquor was fine filtered to remove completely any remaining solid so as to obtain the fine green liquor that was stored in a tank and was ready to use for causticization. The dregs slurry from the bottom of the clarifier was subjected to filtration. The filtered liquor from dregs slurry was combined with the clarified green liquor. The filtered solid dregs together with the fine filtered solid were combined, washed and dehydrated, and then were used as a primary material for cement production.

200 weight parts of lime was slaked with water to form lime slurry. The rough lime grits was removed from the lime slurry, and then the lime slurry was sifted with a 200 mesh sieve screen. The sifted fine lime slurry was ready to use for causticization. The rough lime grits and the siftings separated were combined and incorporated into coal power as a mineralizing agent when the coal was burned in a coal burning boiler.

The first causticization step was conducted by adding the fine green liquor and the fine lime slurry obtained by depuration into a causticiser at a reaction temperature of 68° C. and a total alkalinity of causticization liquor of 82 g/L (expressed as NaOH), wherein the quantity of CaO in the fine lime slurry was 1.03 times of the theoretical quantity needed for the causticization reaction. After the first causticization step, the liquid and solid phases were separated by filtration. The filtered liquid was called white liquor (containing NaOH, $Na_2S$) and was sent to the digester for pulp making. The second causticization step was conducted by adding an excessive amount of the fine green liquor into the filtered solids at a temperature of 68° C. and a total alkalinity of causticization liquor of 82 g/L (expressed as NaOH), wherein the ratio of the weight of the $Na_2CO_3$ contained in the fine green liquor to the weight of the un-reacted excess CaO contained in the filtered solids was 30×106:56. After all CaO was converted into $CaCO_3$ in the second causticization step, the liquid and solid phases were separated by filtration. The filtered liquid was returned to the first causticization step. The filtered solid was washed with water to obtain a pure hydrated precipitated calcium carbonate. A portion of said hydrated precipitated calcium carbonate was used directly as filler for making coated paper to perform application experiments and the effect was good. Another portion of said hydrated calcium carbonate was dried to obtain a finished calcium carbonate product, which was subjected to chemical analysis and determination of particle size distribution. The results are shown in Table 1.

Example 2

200 weight parts of lime was slaked with water to form lime slurry. The rough lime grits was removed from the lime slurry, and then the lime slurry was sifted with a 500 mesh sieve screen. The sifted fine lime slurry was ready to use for causticization. The rough lime grits and the siftings were combined and incorporated into coal power as a mineralizing agent when the coal was burned in a coal burning boiler.

The first causticization step was conducted by adding the fine green liquor obtained in the Example 1 and the fine lime slurry obtained in the present example into a causticiser, at a reaction temperature of 38° C. and a total alkalinity of causticization liquor of 102 g/L (expressed as NaOH), wherein the quantity of CaO in the fine lime slurry was 1.5 times of the theoretical quantity needed for the causticization reaction. After the first causticization step, the liquid and solid phases were separated by filtration. The filtered liquid was called white liquor (containing NaOH, $Na_2S$) and was sent to the digester for pulp making. The second causticization step was conducted by adding an excessive amount of the fine green liquor into the filtered solids at a temperature of 38° C. and a total alkalinity of causticization liquor of 102 g/L (expressed as NaOH), wherein the ratio of the weight of the $Na_2CO_3$ contained in the fine green liquor to the weight of the un-reacted excess CaO contained in the separated solids was 2×106:56. After all CaO was converted into $CaCO_3$ in the second causticization step, the liquid and solid phases were separated by filtration. The filtered liquid was returned to the first causticization step. The filtered solid was washed with water to obtain a pure hydrated precipitated calcium carbonate. A portion of said hydrated precipitated calcium carbonate was used directly as filler for making neutral sized paper to perform application experiments and the effect was good. Another portion of said hydrated calcium carbonate was dried to obtain a finished calcium carbonate product, which was subjected to chemical analysis and determination of particle size distribution. The results are shown in Table 1.

Example 3

In this example, the green liquor was obtained from the combustion procedure of the chemical recovery process in a soda method bagasse pulp mill, and was depurated according to Example 1. When lime was depurated, the lime slurry was sifted with a 600 mesh sieve screen. The two causticization steps were conducted at a reaction temperature of 30° C. and a total alkalinity of causticization liquor of 106 g/L (expressed as NaOH). The test results of the obtained calcium carbonate are shown in Table 1.

Example 4

A quantity of green liquor containing 318 weight parts of $Na_2CO_3$ was obtained from the combustion procedure of the chemical recovery process in a Kraft method reed pulp mill, added in a depurator, and heated to 66° C. A depurating agent solution containing 2.8 weight parts of $CaCl_2$ was added into the depurator under stirring. After sufficient agitation, the mixed green liquor was transferred into a clarifier. The supernatant of the clarified green liquor was fine filtered. The fine filtered fine green liquor was ready to use for causticization. The dregs slurry from the bottom of the clarifier was subjected to filtration. The filtered green liquor from the dregs slurry was combined with the clarified green liquor. The filtered solids together with the fine filtered solid were combined, washed and dehydrated, and then were used as a primary material for cement production. When lime was depurated, the lime slurry was sifted with a 400 mesh sieve screen. The two causticization steps were conducted at a reaction temperature of 46° C. and a total alkalinity of the causticization liquor of 92 g/L (expressed as NaOH). The test results of the obtained calcium carbonate are shown in Table 1.

Example 5

In this example, the green liquor was obtained from the combustion procedure of the chemical recovery process in a soda-anthraquinone method wheat straw pulp mill. The green liquor was depurated according to the same procedure and conditions in Example 4. The lime depuration was conducted according to Example 3. The two causticization steps were conducted at a reaction temperature of 20° C. and a total alkalinity of causticization liquor of 108 g/L (expressed as NaOH). The test results of the obtained calcium carbonate product are shown in Table 1.

TABLE 1

Process conditions in examples and test results of the obtained precipitated $CaCO_3$

| Process conditions and measured parameters | Example 1 Wood pulp Kraft method | Example 2 Wood pulp Kraft method | Example 3 Bagasse pulp Soda method | Example 4 Reed pulp Kraft method | Example 5 Wheat straw pulp Soda-anthraquinone method |
|---|---|---|---|---|---|
| Green liquor depurating agent | $Ca(OH)_2$ | $Ca(OH)_2$ | $Ca(OH)_2$ | $CaCl_2$ | $CaCl_2$ |
| sieve screen for sifting lime slurry, (mesh) | 200 | 500 | 600 | 400 | 600 |
| reaction temperature, ° C. | 68 | 38 | 30 | 46 | 20 |
| Total alkalinity of causticization liquor (as NaOH), g/L | 82 | 102 | 106 | 92 | 108 |
| $CaCO_3$ (dry), % | 98.21 | 98.18 | 98.56 | 90.35 | 88.60 |
| Settling volume, ml/g | 3.2 | 4.6 | 5.6 | 3.5 | 5.8 |
| Residues on sieve screen (45 μm), % | 0.02 | 0 | 0 | 0.01 | 0 |
| Insoluble matter in HCl solution, % | 0.086 | 0.085 | 0.10 | 8.28 | 9.45 |
| Free alkali (as CaO), % | 0.052 | 0.056 | 0.082 | 0.083 | 0.091 |
| Iron (Fe), % | 0.046 | 0.048 | 0.056 | 0.086 | 0.064 |
| Manganese (Mn), % | 0.0041 | 0.0042 | 0.0038 | 0.0036 | 0.0039 |
| Whiteness, % | 92.2 | 92.6 | 96.3 | 91.8 | 92.6 |
| Average particle size, μm | 2.9 | 0.80 | 0.62 | 1.8 | 0.42 |
| Particle size < 2 μm, % | 53.8 | 99.0 | 99.2 | 92.6 | 99.6 |

The chemical analysis results of the precipitated $CaCO_3$ obtained in Examples 1, 2 and 3 show that the precipitated calcium carbonate obtained from the black liquors of the wood pulp and bagasse pulp mills all meet the quality standard as set forth in the National Standards of People's Republic of China, GB4794-84. Further, these $CaCO_3$ products possess higher settling volume than that of the National Standard, which indicates that said $CaCO_3$ products have better dispersivity.

The results of chemical analysis of the precipitated $CaCO_3$ products obtained in Example 4 and 5 show that the precipitated $CaCO_3$ products obtained from the black liquors of the wheat-straw pulp and reed pulp mills have higher contents of insoluble matter in HCl solution and lower contents of $CaCO_3$ in comparison with the National Standards, and other parameters are in correspondence with the National Standards. The higher content of insoluble matter in HCl solution is due to the higher content of silicon in black liquors. The experiments show that when the content of silicon in $CaCO_3$ is higher, the aggregation of calcium carbonate particles is inhibited. Therefore, the dispersivity of the calcium carbonate is increased. When said calcium carbonate products are used as filler for papermaking, better results are achieved.

The results of scanning electron microscopy and the application experiments show that the precipitated calcium carbonate products obtained in the above five examples possess almost the same crystal form, i.e. short rod with smooth round ends. The application experiments indicate that the results of using the calcium carbonate having such a crystal form as paper filler are better than that of the spindle-shaped calcium carbonate commonly used in the papermaking industry. The precipitated calcium carbonate produced by the present invention is particularly suitable for higher speed paper machines, because there is less abrasion to the paper machines.

The test results of the particle size distribution of the precipitated $CaCO_3$ products obtained in the above examples show that a series of precipitated calcium carbonate products having various particle sizes, including the superfine precipitated $CaCO_3$ with an average particle size smaller than 1 μm, can be produced by regulating the process conditions in the present invention.

As comparing with the conventional chemical recovery process from the black liquor in alkaline pulping, the present invention avoids the generation of solid waste from the beginning, saves the procedure for treatment of lime mud, and greatly reduces the equipment investment and energy consumption for the chemical recovery process. Further, a superfine precipitated calcium carbonate as another important primary material for paper making industry is directly produced while the alkali is recovered. In conclusion, the present invention is of great environmental significance, and at the same time can generate tremendous economic benefits.

What is claimed is:

1. A process for causticizing green liquor in chemical recovery from black liquor in alkaline pulping, comprising the procedures of:
   (1) slaking lime with water or weak wash water to form a lime slurry containing lime grits; separating rough lime grits from the lime slurry to obtain the rough lime grits and a lime slurry from which the rough lime grits has been removed; sifting the thus obtained lime slurry with a 180-800 mesh sieve screen (excluding 180 mesh sieve screen) to obtain siftings and a fine lime slurry for causticization; and the siftings and the rough lime grits are mixed to obtain lime grits that can be used as a mineralizer when coal is burned in a coal burning boiler;
   (2) adding green liquor obtained by dissolving a smelt formed by evaporating and burning black liquor in alkaline pulping into a depurator; adding to the depurator a green liquor depurating agent whose active component is $Ca^{2+}$ at a temperature between 0° C. and 80° C. (excluding 80° C.) accompanied with sufficient agitation; transferring the green liquor to which the depurating agent is added into a green liquor clarifier to carry out clarification, obtaining a supernatant and dregs at the bottom of the clarifier; filtering the dregs at the bottom of the clarifier to obtain solids and a filtrate; and subjecting the filtrate together with the supernatant obtained in the clarifier to a fine filtration to obtain a fine green liquor; and
   (3) conducting a first causticization step by adding the fine green liquor obtained in procedure (2) and the fine lime slurry obtained in procedure (1) into a causticiser at a reaction temperature between 0° C. and 70° C. (excluding 70° C.), wherein the quantity of CaO contained in the fine lime slurry is 1-1.6 times of the theoretical quantity needed for causticization reaction; subjecting the mixture obtained after the first causticization step to a solid-liquid separation to obtain an alkali liquor that is commonly called as white liquor and solids; conducting a second causticization step by adding the fine green liquor obtained in procedure (2) into the solids obtained after the first causticization step at a reaction temperature between 0° C. and 70° C. (excluding 70° C.), wherein the ratio of the weight of $Na_2CO_3$ contained in the fine green liquor to the weight of CaO contained in the solids separated after the first causticization step is 106n: 56, wherein n =1-50; after all CaO is converted into $CaCO_3$, subjecting the mixture obtained after the second causticization step to a solid-liquid separation to obtain a solution and solids; returning the obtained solution to the first causticization step; and washing the obtained solids to obtain a pure hydrated precipitated calcium carbonate product.

2. The process according to claim 1, wherein the green liquor depurating agent is any substance that can provide $Ca^{2+}$ ions.

3. The process according to claim 2, wherein the green liquor depurating agent is solutions, suspensions and solids containing any one of various soluble calcium salts, CaO and $Ca(OH)_2$, or mixtures thereof.

4. The process according to claim 3, wherein the soluble calcium salt is $CaCl_2$ or $Ca(NO_3)_2$.

5. The process according to claim 3, wherein the green liquor depurating agent is a slurry containing $Ca(OH)_2$, a solution containing $CaCl_2$ or a mixture of the both.

6. The process according to claim 5, wherein the slurry containing $Ca(OH)_2$ (expressed as CaO) is solely used as the green liquor depurating agent, and the weight ratio of the CaO in the depurating agent to the $Na_2CO_3$ in the green liquor is 0.01-1:106.

7. The process according to claim 2, wherein in procedure (1), the lime slurry is sifted with a 200 (or more) mesh sieve screen; and in procedure (3), the causticization reaction temperature is lower than 70° C., the total alkalinity of the causticization reactants (expressed as NaOH) is higher than 80 g/L, and a precipitated calcium carbonate product, wherein ≧50% of the calcium carbonate has a particle size below 2 μm, is obtained.

8. The process according to claim 5, wherein in procedure (1), the lime slurry is sifted with a 200 (or more) mesh sieve screen; and in procedure (3), the causticization reaction temperature is lower than 70° C., the total alkalinity of the causticization reactants (expressed as NaOH) is higher than 80 g/L, and a precipitated calcium carbonate product, wherein ≧50% of the calcium carbonate has a particle size below 2 μm, is obtained.

9. The process according to claim 7, wherein in procedure (1), the lime slurry is sifted with a 400 (or more) mesh sieve screen; and in procedure (3), the causticization reaction temperature is lower than 50° C., the total alkalinity of the causticization reactants (expressed as NaOH) is higher than 90 g/L, and a precipitated calcium carbonate product, wherein ≧90% of the calcium carbonate has a particle size below 2 μm, is obtained.

10. The process according to claim 8, wherein in procedure (1), the lime slurry is sifted with a 400 (or more) mesh sieve screen; and in procedure (3), the causticization reaction temperature is lower than 50° C., the total alkalinity of the causticization reactants (expressed as NaOH) is higher than 90 g/L, and a precipitated calcium carbonate product, wherein ≧90% of the calcium carbonate has a particle size below 2 μm, is obtained.

11. The process according to claim 9, wherein in procedure (1), the lime slurry is sifted with a 500 (or more) mesh sieve screen; and in procedure (3), the causticization reaction temperature is lower than 40° C., the total alkalinity of the causticization reactants (expressed as NaOH) is higher than 100 g/L, and a superfine precipitated calcium carbonate product having an average particle size of less than 1 μm is obtained.

12. The process according to claim 10, wherein in procedure (1), the lime slurry is sifted with a 500 (or more) mesh sieve screen; and in procedure (3), the causticization reaction temperature is lower than 40° C., the total alkalinity of the causticization reactants (expressed as NaOH) is higher than 100 g/L, and a superfine precipitated calcium carbonate product having an average particle size of less than 1 μm is obtained.

* * * * *